Sept. 18, 1945.  E. W. PERRY  2,384,847
COOKING GRILL
Filed Oct. 13, 1943

INVENTOR
EDWARD W. PERRY
BY Hyde and Meyer
ATTORNEYS

Patented Sept. 18, 1945

2,384,847

UNITED STATES PATENT OFFICE 2,384,847

COOKING GRILL

Edward W. Perry, Euclid, Ohio

Application October 13, 1943, Serial No. 506,027

4 Claims. (Cl. 99—450)

This invention relates to improvements in grills of the type customarily used over open fires for broiling steaks and the like.

An object of the present invention is to provide a grill which is simple and cheap to construct and which protects the meat from burning and which, by the nature of the method of transmitting heat through the grill to the meat, renders the same very tender. At the same time the grill is very pleasing in appearance and of strong and sturdy construction.

Other objects of the present invention will appear from the accompanying drawing and specification and the essential features will be summarized in the claims.

In the drawing,

Fig. 6 is a fragmental sectional view taken along the line 6—6 of Fig. 5; while

My improved grill is comprised essentially of interlaced strips of metal or the like forming a plurality of cells extending through the grill, together with means for partially or substantially entirely closing off some of the cells. I thus provide an even pattern of alternate closed and open cells, so that certain spots of the meat on the grill are subjected directly to the full heat of the fire while closely adjacent spots on all sides of a heated spot are somewhat protected from the fire. This not only protects the meat against the customary burning or scorching encountered over open fires but also produces some effect on the tendons of the meat which I am unable to fully explain, but which renders the meat much more tender than when cooked over the usual open grill.

Figure 3:
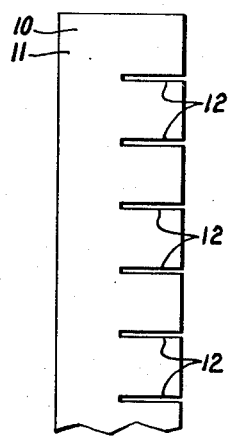
Fig. 3 is an elevational view of one of the strips of material used to form the grill of Fig. 1.

A very simple form which I have conceived for carrying out my invention is herein disclosed as comprising strips of metal arranged in two sets 10 and 11, the strips of each set standing on edge and at right angles to the strips of the other set. I provide for the interlacing or interlocking of the two sets in a very simple manner. As shown in Fig. 3, each strip is provided with a series of parallel slots 12 extending from one side edge of the strip approximately half way through and at right angles to the side edge. When sets of strips are interengaged crossing each other at right angles, the slotted zones of the strips of one set interengage the slotted zones of the strips of the other set so as to form a plurality of rectangular cells over the entire area of the grill. Certain of these cells have been indicated by the numeral 13.

Figure 1:
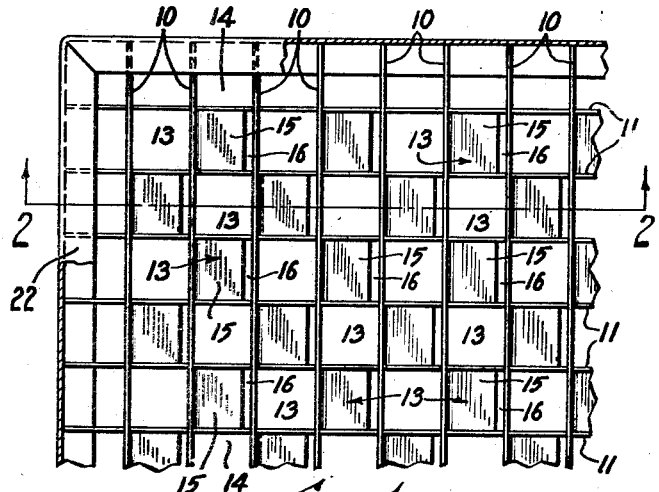
Fig. 1 is a plan view of one corner of my improved grill with parts broken away to more clearly show the construction.
Figure 2:
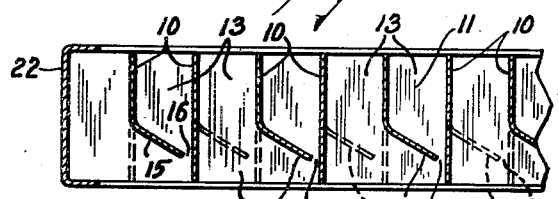
Fig. 2 is a sectional view taken along the line 2—2 of Fig. 1.

As best seen in Figs. 1 and 2, instead of using some additional means for closing off part of said cells, I utilize a portion of the strips 10 and 11 for this purpose. As shown on row 14—14 of Fig. 1, the portions 15 represent every other tongue between the slots 12 of one of the strips 10 bent in the same direction or toward the right as viewed in Fig. 1. These tongues 15 may be bent varying amounts across the cell but preferably I bend them almost to the opposite wall of the cell, leaving an opening as indicated at 16 of the order of 1/16 of an inch wide, which permits drippings to drain from the partially closed cells.

As best seen in Figs. 1 and 2, the tongues 15 of one row are arranged in staggered relation with respect to the tongues of the adjacent row so that an even pattern of open and closed cells is formed over the entire area of the grill.

The slots 12 may be formed by sawing or punching with a die so that the slots are formed cleanly as shown in Fig. 3.

Figure 5:
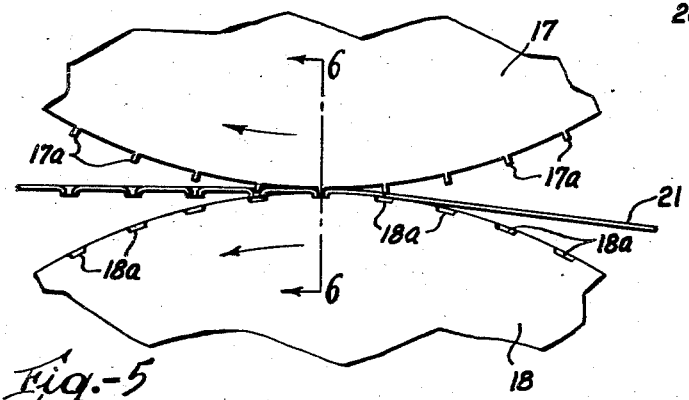
Fig. 5 is a fragmental elevational view of one means for forming the slots in the strips which form the grill.
Figure 6:
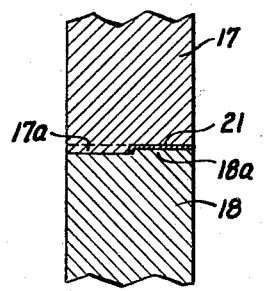
Figure 7:
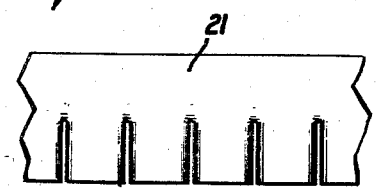
Fig. 7 is a view similar to Fig. 3 and illustrating the appearance of a strip formed according to Figs. 5 and 6.

Another manner of forming these slots is shown in Figs. 5 and 6, where a pair of coacting wheels 17 and 18 are provided with matching punch and die openings 17a and 18a respectively. A strip 21 is then fed between the rolls from right to left as viewed in Fig. 5, whereupon the metal is split by the action of the punch and die members shown. Since these punch and die members extend half way across the thickness of the rolls as shown in Fig. 6, the slots are formed in the strip as shown in Fig. 7. This leaves slight burrs on the parallel sides of the slot, but in many cases these are not objectionable. It will be understood that the metal strip 21 may be of very light weight, say of the order of 22 gauge, so that the metal is easily split by the method just described. It should be understood that the strip 21 of Fig. 7 or the strip of Fig. 3 may be formed in great lengths, even rolled, if desirable, and these may be later sheared to the proper length to form strips like those indicated at 10 and 11. Because of the large number of interlocked joints of the assembled grill, it is nevertheless very strong and of relatively light weight when completed.

Figure 4:
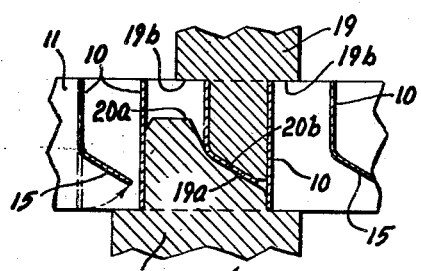
Fig. 4 is a view similar to a portion of Fig. 2 illustrating one manner of forming certain bent portions of the grill.

One method I have conceived of bending the tongues 15 from the dot-dash position of Fig. 4 to the full line position is illustrated diagrammatically therein. Here I have provided a pair of mating dies 19 and 20 above and below the grill respectively. The die 19 has an inclined face 19a which lies in the position which the tongue 15 will assume when the shoulders 19b rest on the upper face of the grill. The die 20 has a leading portion 20a adapted to gradually force the tongue 15 toward the right as viewed in Fig. 4 and the surface 20b is parallel to the surface 19a when the dies are driven home. Of course in actual practice there would be a set of dies entering each cell where a tongue 15 was to be bent.

My improved grill is easily formed without difficulty after the strips 10 and 11 have been slotted and cut to length. One of the sets, say 10, may be placed in position in a guide or jig with the slots opening upwardly and then the other set, say 11, may be slid into position with the slots of one set interengaging the slots of the other set. Obviously, if the slots go half way through the strips of each set, then in the final assembled form the edges of the two sets will lie in the same plane on both the upper and lower faces of the grill.

The grill may be finished off in any desired manner for strength and appearance. For instance, a channel 22 may extend around the periphery of the grill with the flanges of the channel overlying the ends of the strips 10 and 11 as indicated in Figs. 1 and 2.

The grill may be provided with legs or other means of support or may be provided with a carrying bail without the necessity of illustrating the same here.

What I claim is:

1. A grill for cooking over a source of heat comprising spaced intersecting heat resisting members providing a plurality of cells in said grill, a substantial group of said cells being open entirely through the grill, and a substantial group of said cells being approximately closed in a substantially regular pattern over the area of the grill.

2. The grill of claim 1 wherein said closed cells form a regular pattern wherein each open cell is substantially surrounded by closed cells.

3. A grill comprising interlaced strips extending generally at right angles to each other, said strips dividing the area of said grill into a plurality of cells, a substantial group of said cells being open entirely through the grill, and a substantial group of said cells having portions of said strips bent transversely of said cells to substantially close them in a substantially regular pattern over the area of the grill.

4. A grill for cooking over a source of heat comprising metal strips each provided with parallel slots extending from one side edge thereof partially across the strip at right angles to said one side edge providing tongues between the slots, said strips being assembled in parallel sets at right angles to each other on edge with the slotted zones of the strips of one set interengaging the slotted zones of the strips of the other set whereby to interlock said strips to form a regular pattern of rectangular cells extending over the area of the grill, and some of said tongues being bent transversely of half of said cells to substantially close them, said substantially closed cells forming an even pattern over the area of the grill and staggered with respect to the cells remaining open.

EDWARD W. PERRY.